United States Patent [19]

Disselkoen, Jr. et al.

[11] Patent Number: 4,877,202
[45] Date of Patent: Oct. 31, 1989

[54] PRONATED ESCAPE SYSTEM FOR FIGHTER AIRCRAFT

[75] Inventors: Allen D. Disselkoen, Jr., Dayton, Ohio; Robert F. Gargiulo, Bedford, Mass.; James E. Haywood, Redlands, Calif.; Keith H. Heise, Huber Heights, Ohio; Darrell H. Holcomb, Helotes, Tex.; Stuart C. Kramer, Beavercreek, Ohio; Gregory R. Miller, Roy, Utah; Jeffrey S. Nicholson, Albuquerque, N. Mex.; Jeffrey J. Olinger, Tijeras, N. Mex.; Curtis H. Spenny, Bellbrook, Ohio

[73] Assignee: The United States of America as represented by the Secretary of the Air Force, Washington, D.C.

[21] Appl. No.: 277,576

[22] Filed: Nov. 23, 1988

[51] Int. Cl.⁴ .................................................. B64D 25/10
[52] U.S. Cl. ........................... 244/122 A; 244/122 AG
[58] Field of Search ....... 244/122 R, 122 A, 122 AG, 244/140, 141; 297/216; 280/748, 751

[56] References Cited

U.S. PATENT DOCUMENTS

| | | | |
|---|---|---|---|
| 2,806,666 | 9/1957 | Brown et al. | 244/122 A |
| 2,959,382 | 11/1960 | Turner | 244/122 AG |
| 4,218,035 | 8/1980 | Jordan | 244/122 |
| 4,335,918 | 6/1982 | Cunningham | 297/216 |
| 4,749,153 | 6/1988 | Herndon | 244/122 |
| 4,784,352 | 11/1988 | Smith et al. | 297/216 |

Primary Examiner—Joseph F. Peters, Jr.
Assistant Examiner—Rodney A. Corl
Attorney, Agent, or Firm—Bobby D. Scearce; Donald J. Singer

[57] ABSTRACT

An improved aircraft ejection seat system is described which embodies a forward leaning position for an occupant of the aircraft providing enhanced acceleration tolerance for an occupant during ejection from the cockpit, comprising a platform supporting at a rearward end thereof a seat having a seat back and seat pan sized and configured for accommodating the occupant, a forwardly disposed cowling integral with and faired to the platform for providing windblast protection to the occupant, a solid or cushioned upright wall member disposed centrally of the platform and extending between the seat and cowling and supporting an inclined chest plate for supporting the chest of the occupant in the forward leaning position, a head rest and a shield disposed near the upper end of the plate for shielding the occupant's head upon ejection from the aircraft, and a restraint harness for holding the occupant in the forward leaning position against the plate upon ejection from the aircraft.

5 Claims, 2 Drawing Sheets

PRONATED ESCAPE SYSTEM FOR FIGHTER AIRCRAFT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to aircraft ejection seats, and more particularly to an aerodynamic ejection seat system for escape from a fighter aircraft providing a forward leaning or pronated position for the escaping occupant.

Presently used ejection seats for military aircraft are substantially upright types which suffer certain undesirable characteristics including the pilot being seated in an unfavorable position for withstanding high catapult acceleration, very little windblast protection during ejection and a seat which is basically aerodynamically unstable in the windstream. These limitations are distinct disadvantages for future fighter aircraft types in which progressively larger flight envelopes will require correspondingly larger escape system performance envelopes.

The invention solves or substantially reduces in critical importance shortcomings in existing ejection systems by providing an ejection seat for a pilot which incorporates a forward leaning or pronated flying position providing enhanced pilot acceleration tolerance. According to the invention, a pilot is ejected seated in a forwardly leaning position in a module including an integral aerodynamic front cowling for stability and protection against windblast, a chest support for high-g maneuvering, parachute and survival gear storage, and other features providing protection for ejections at 70,000 feet altitude, Mach 3 air speed and maximum dynamic pressure of 2000 pounds per square foot (psf). The system is capable of zero altitude/zero air speed ejections.

It is therefore a principal object of the invention to provide an improved ejection seat system for fighter aircraft.

It is a further object of the invention to provide an ejection seat system for fighter aircraft providing improved g-tolerance and pilot protection throughout an expanded ejection envelope.

It is a further object of the invention to provide an improved ejection seat system for fighter aircraft having improved windblast protection and stability in the windstream on ejection.

These and other objects of the invention will become apparent as the detailed description of representative embodiments proceeds.

SUMMARY OF THE INVENTION

In accordance with the foregoing principles and objects of the invention, an improved aircraft ejection seat system is described which embodies a forward leaning position for an occupant of the aircraft providing enhanced acceleration tolerance for an occupant during ejection from the cockpit, comprising a platform supporting at a rearward end thereof a seat having a seat back and seat pan sized and configured for accommodating the occupant, a forwardly disposed cowling integral with and faired to the platform for providing windblast protection to the occupant, a solid or cushioned upright wall member disposed centrally of the platform and extending between the seat and cowling and supporting an inclined chest plate for supporting the chest of the occupant in the forward leaning position, a head rest and a shield disposed near the upper end of the plate for shielding the occupant's head upon ejection from the aircraft, and a restraint harness for holding the occupant in the forward leaning position against the plate upon ejection from the aircraft.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
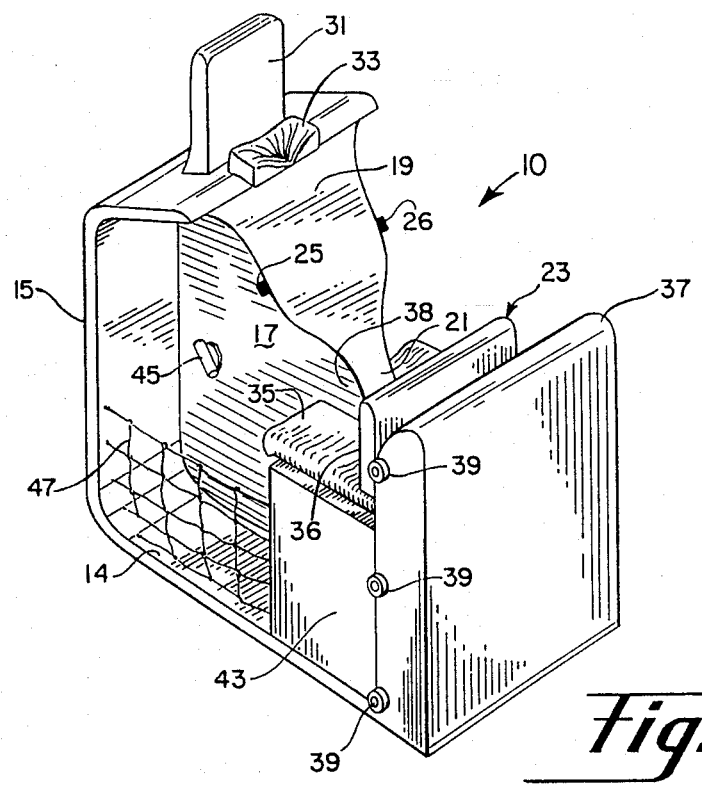
FIG. 1 is a schematic perspective view of a representative ejection seat system of the invention.
Figure 2:
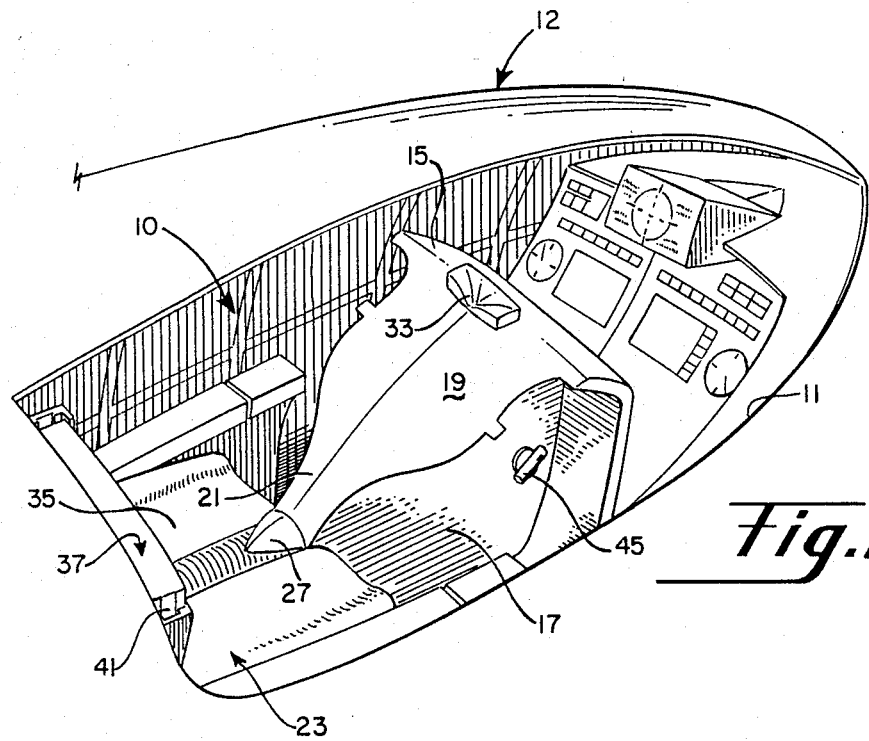
FIG. 2 is a pictorial representation of the system of FIG. 1 incorporated into an aircraft cockpit.
Figure 3:
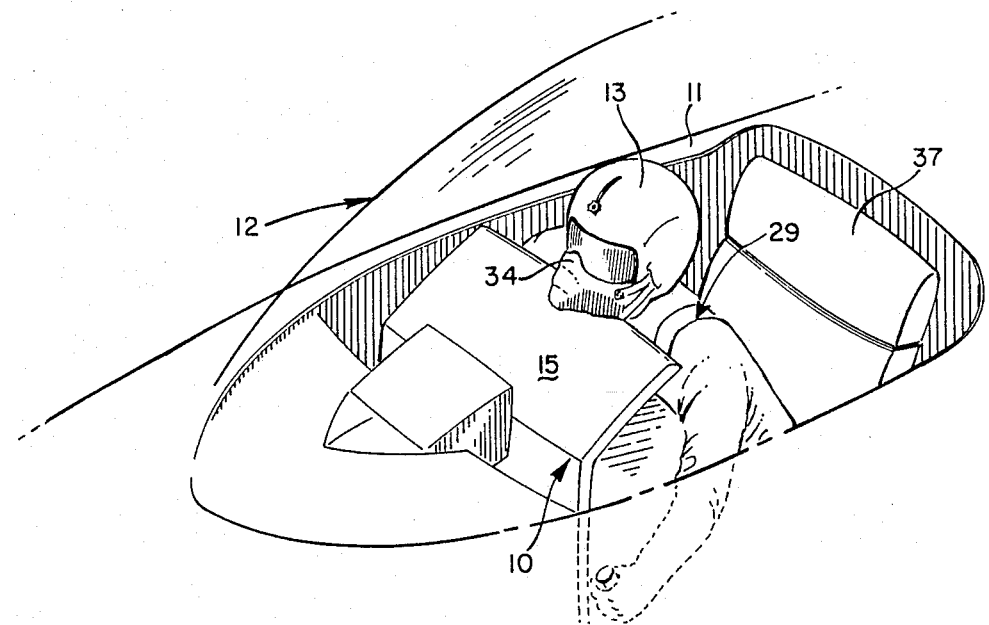
FIG. 3 is another view of the system of FIG. 1 within an aircraft cockpit with a pilot at the controls.

Referring now to the drawings, shown in FIG. 1 is a schematic perspective view of a representative configuration for ejection seat system 10 of the invention. FIG. 2 is a pictorial representation of system 10 incorporated into cockpit 11 of aircraft 12, and FIG. 3 is another view of system 10 within aircraft 12 with pilot 13 at the controls. As suggested above, system 10 comprises an ejection seat for fighter aircraft 12 which incorporates a forward leaning (pronated) position for pilot 13 which allows increased acceleration tolerance for pilot 13 upon ejection. System 10 includes platform 14 including a forwardly disposed and generally upwardly and rearwardly extending integral front cowling 15 providing windblast protection to pilot 13 during ejection. Cowling 15 has aerodynamic shape for stabilization and drag reduction in the airstream upon ejection. A vertically disposed solid or cushioned wall member in the form of chest support 17 supporting laterally disposed chest plate 19 including abdomen support portion 21 interconnects cowling 15 and seat 23. Chest plate 19 preferably comprise a conformal rate-dependent semi-rigid foam supporting the chest and abdomen of pilot 13 during high-g maneuvering and ejection. Plate 19 may further include connectors 25,26,27 for attachment of restraint system (harness) 29 (FIG. 3). Support 17 is preferably sized and configured to house inertial units (reels) for the restaint system, microprocessor control, oxygen, and propulsion fuel for system 10.

A movable head shield 31, shown in the raised position in FIG 1 and hidden in FIGS. 2 and 3, may be raised from a stored position within cowling 15 and support 17 to an operative position shown in FIG. 1 upon initiation of the ejection sequence. Shield 31 is configured and placed to protect the head of pilot 13 from windblast during ejection. In an alternative configuration, head shield 31 may be permanently fixed in the position shown in FIG. 1 and configured as a head up display (HUD). Chin or head rest 33 supports the head of pilot 13 in a forward leaning position and restrained as shown in FIG. 3. Use of chin rest 33 may necessitate use by pilot 13 of a full face helmet 34.

Seat 23 includes an appropriately contoured seat pan 35 and lower back support 36 and means 38 for adjusting seat pan 35 position along abdomen support portion 21 of chest plate 19 in order to comfortably accommodate pilots 13 of a wide range of physical stature. A system 10 built in demonstration of the invention was shown to accommodate the 5th to 95th percentile pilots as to size. Seat back 37 forms a structural part of system 10 and supports catapult rollers 39 engageable with guides 41 in cockpit 11 (FIG 2) to guide system 10 clear of aircraft 12 upon ejection. Seat back 37 may be sized to enclose suitable propulsion and/or ballistic means to eject system 10 and to store deployable recovery parachutes. Seat bottom 43 may contain propulsion and survival gear. The demonstration system had overall dimensions of about 41 inches long by 36 inches high by 22 inches wide.

Ejection handle 45 controlling the mechanism for ejecting system 10 from cockpit 11 is preferably located on support 17 as suggested in FIGS. 1 or 2 for easy access by pilot 13 in the ejection ready position illustrated in FIG. 3.

Figure 4:
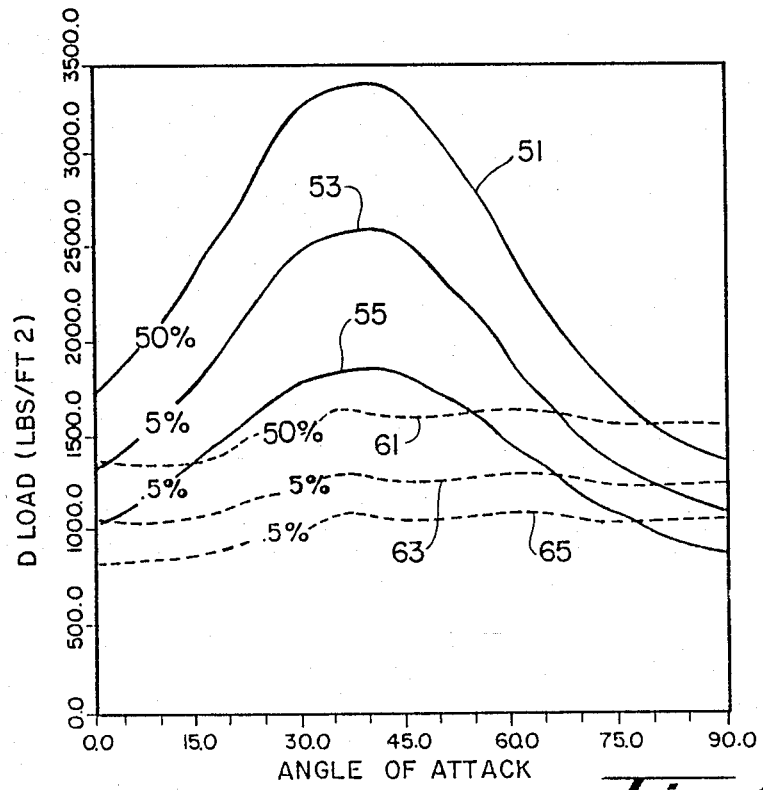
FIG. 4 shows graphs of dynamic pressure load limit versus angle of attack of an existing ejection system compared to that of the invention.

Referring now to FIG. 4, shown therein are graphs of dynamic pressure load limits versus angle of attack (ejection attitude) for a 50th percentile size pilot for an ejection seat currently used in typical fighter aircraft (viz, F-16) compared to corresponding data for the invention. Graphs 51,53,55 show maximum dynamic pressure limits for the seat of the invention for high (about 50%), moderate (about 5%) and low (about 0.5%) probability of injury to the pilot, respectively. In contrast, graphs 61,63, 65 show the substantially lower load limits for the existing seat for the same probability of injury levels. FIG. 4 shows that to experience a moderate probability of injury or less, the maximum incompressible dynamic pressure for the existing seat is about 1200 pounds per square foot (psf), whereas for the seat of the invention the maximum is about 2500 psf. This indicates safe ejection at higher air speeds is possible with the invention. Additionally, catapult force analysis revealed that the existing seat has maximum catapult acceleration for low, moderate and high risk of injury to the pilot of about 11.43, 14.24 and 19.05 g, respectively. The invention, however, has respective low, moderate and high risk acceleration levels of 13.38, 16.68 and 22.28 g.

In the operation of aircraft 12 including system 10 of the invention, pilot 13 can conveniently manipulate aircraft controls and maintain full view of control instrumentation from either a relaxed position leaning back against back support 36, or from forward leaning (pronated) position with the chest against chest plate 19 as suggested in FIG. 3. In the forward leaning position, harness 29, connected at 25,26 to inertial reels (not shown) within support 17, may allow a degree of freedom of movement in normal flight, and, for maneuvering or ejecting, locks down and holds pilot 13 firmly against chest plate 19. Aircraft controls (stick, throttles, rudder pedals, etc) may be positioned within cockpit 11 to either side of platform 14 and cowling 15.

In order to begin the ejection sequence, pilot 13 assumes the position suggested in FIG. 3 and pulls ejection handle 45 in order to lock the inertial reels connected to harness 29, deploy a protective fabric fence 47 to secure the pilot's feet behind cowling 15, and extend (if movable) head shield 31. A catapult located within or below seat bottom 43 then fires to propel system 10 from cockpit 11 clear of aircraft 12 empennage. A microprocessor controlled sustainer rocket will provide sufficient thrust to achieve safe altitude in zero altitude/zero velocity ejections. The sustainer rocket's thrust angle is controlled to rapidly stablize the seat at its trim angle. Trim angle for the seat of system 10 may be selected according to data underlying the graphs of FIG. 4 in order to optimize aerodynamic properties of system 10 so that pilot 13 acceleration tolerance is maximized. At speeds below about 500 knots, a drogue chute may be deployed to enhance stability. The pilot remains fully protected (his torso via the cowling and his head via the head shield) while the seat decelerates. When the system senses that the seat has slowed sufficiently, harness 29 is loosened and a parachute is deployed, which pulls pilot 13 and seat bottom 43 clear of cowling 15.

The pronated position seat of the invention provides substantial improvement in pilot g protection and escape system performance over existing systems. A pronated position seat front angle of 35° provides more g tolerance during high-g flight manuevering than conventional upright seats and the same g tolerance as a reclined seat with a seat back angle of 65°. The more favorable orientation allows pilot 13 to sustain significantly greater catapult accelerations during ejection than in conventional upright seats. Computer simulations indicate that a seat built according to these teachings will allow ejections within a moderate probability of injury level at dynamic pressures in excess of 2000 psf for seat angles of attack between 19° and 57° (for the 50th percentile size pilot) compared to about 1200 psf for existing systems. The peak dynamic pressure limit for the demonstration system at a moderate injury risk level is estimated at about 2580 psf for a 40° angle of attack, which may be increased through aerodynamic refinement by decreasing seat deceleration. The system of the invention is capable of successful pilot ejection in a high life threat situation (shortest time between ejection initiation and aircraft impact giving an acceptable probability of pilot survival) as low as 0.25 second without subjecting the pilot to excessive catapult accelerations.

Aerodynamic analyses of the demonstration system showed:

(a) the invention to have static longitudinal stability for angles of attack between 5° and 85° and to be neutrally stable for angles of attack between −30° and 5°, whereas a conventional seat exhibits static longitudinal stability for angles of attack between 0° and −60° and is neutrally stable for angles of attack between 0° and 20°;

(b) the invention to have trim angle from 50° for a 5th percentile pilot size to 52° for a 95th percentile pilot size (i.e. stability at the trim angle) which may be tailored by aero shaping and/or adjustment of the center of gravity, whereas a conventional seat trims at angles of attack between −40° and −45°;

(c) the invention to have static directional stability for a sideslip angle between 0° and 7° and neutral stability between 7° and 30°, and the same for negative sideslip angles, whereas a conventional seat exhibits unstable directional characteristics;

(d) the invention to have neutral static lateral stability for sideslip angles between 0° and 12° whereas a conventional seat displays lateral instability throughout the entire yaw range.

The invention therefore provides an improved ejection seat system for an aircraft. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An ejectable seat system for an aircraft cockpit, comprising:
   (a) a platform supporting at a rearward end thereof a seat having a seat back and seat pan sized and configured for receiving an occupant of said cockpit;
   (b) said platform supporting at a forward end thereof a generally upwardly extending cowling substantially integral with said platform and faired therewith for providing windblast protection to said occupant upon ejection from said cockpit;
   (c) an upright wall member disposed on said platform generally centrally thereof and extending between said seat and said cowling, said wall member supporting an inclined chest plate extending generally from said seat pan to an upper end of said cowling for supporting the chest of said occupant in a forward leaning position within said cockpit;
   (d) a shield disposed on said cowling near an upper end of said plate for shielding the head of said occupant upon ejection from said cockpit; and
   (e) harness means for releasably holding said occupant in said forward leaning position against said plate upon ejection from said cockpit.

2. The system of claim 1 further comprising a head rest of said plate substantially immediately behind said shield for supporting the head of said occupant upon ejection from said cockpit.

3. The system of claim 1 further comprising means interconnecting said seat pan and plate for adjusting the position of said seat pan along said plate.

4. The system of claim 1 further comprising a deployable fabric fence laterally of said platform and extending generally between said seat and said cowling for confining the feet of said occupant behind said cowling upon ejection from said cockpit.

5. The system of claim 1 further comprising a plurality of rollers attached to said seat back for engaging corresponding guides mounted within said cockpit for guiding said seat upon ejection from said cockpit.

* * * * *

UNITED STATES PATENT AND TRADEMARK OFFICE
CERTIFICATE OF CORRECTION

PATENT NO. : 4,877,202
DATED : October 31, 1989
INVENTOR(S) : Allen D. Disselkoen, Jr. et al It is certified that error appears in the above-identified patent and that said Letters Patent is hereby corrected as shown below:

Col 6, claim 2, line 2, "of" should be "on".

Signed and Sealed this

Twenty-fifth Day of December, 1990

*Attest:*

HARRY F. MANBECK, JR.

*Attesting Officer*      *Commissioner of Patents and Trademarks*